(12) United States Patent
Maehashi

(10) Patent No.: US 9,986,194 B2
(45) Date of Patent: May 29, 2018

(54) SOLID STATE IMAGING DEVICE AND IMAGING SYSTEM

(71) Applicant: CANON KABUSHIKI KAISHA, Tokyo (JP)

(72) Inventor: Yu Maehashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/595,488

(22) Filed: May 15, 2017

(65) Prior Publication Data
US 2017/0347049 A1 Nov. 30, 2017

(30) Foreign Application Priority Data
May 26, 2016 (JP) .................................. 2016-105158

(51) Int. Cl.
*H04N 3/14* (2006.01)
*H04N 5/335* (2011.01)
(Continued)

(52) U.S. Cl.
CPC ............... *H04N 5/378* (2013.01); *H04N 5/14* (2013.01); *H04N 5/66* (2013.01); *H04N 2005/7483* (2013.01)

(58) Field of Classification Search
CPC ...... H04N 5/341; H04N 5/376; H04N 5/3765; H04N 5/378; H04N 5/3745; H04N 5/374; H03M 1/00; H03M 1/56
(Continued)

(56) References Cited

U.S. PATENT DOCUMENTS 8,089,544 B2 1/2012 Funaki
8,350,941 B2 * 1/2013 Kukita ............... H04N 5/23241
250/208.1
(Continued)

FOREIGN PATENT DOCUMENTS

JP 2009-239442 10/2009
JP 2015-518696 7/2015
JP 2015-173432 10/2015

OTHER PUBLICATIONS

Masahide Goto et al., "Three-Dimensional Integrated CMOS Image Sensors with Pixel-Parallel Signal Processors," The Institute of image Information and Television Engineers (ITE) technical report, vol. 39, No. 16, pp. 5-8, Mar. 2015 (with English language Abstract).

*Primary Examiner* — Kelly L Jerabek
(74) *Attorney, Agent, or Firm* — Fitzpatrick, Cella, Harper & Scinto

(57) ABSTRACT

A solid state imaging device includes a photoelectric conversion unit that generates a signal based on an incident light by photoelectric conversion; a transfer unit that transfers the signal from the photoelectric conversion unit; a ramp wave generating unit that has an input node where the signal is transferred and that generates a ramp wave whose voltage changes with time at a slope based on a potential of the input node; a detection unit that detects a change in a relationship between the ramp wave and a threshold voltage; a ramp wave reset unit that resets the ramp wave voltage upon detection of a change in the relationship; a control unit that causes the detection unit to repeatedly detect a change in the relationship; and a digital value acquisition unit that acquires a digital value corresponding to the number of repetitions for which a change in the relationship is detected.

15 Claims, 13 Drawing Sheets

(51) Int. Cl.
*H04N 5/378* (2011.01)
*H04N 5/14* (2006.01)
*H04N 5/66* (2006.01)
*H04N 5/74* (2006.01)

(58) Field of Classification Search
USPC ......... 348/300, 302, 308; 341/164, 169–170,
341/155; 250/208.1
See application file for complete search history.

(56) References Cited

U.S. PATENT DOCUMENTS

| | | | |
|---|---|---|---|
| 8,598,901 B2 | 12/2013 | Hiyama | |
| 8,711,259 B2 | 4/2014 | Maehashi | |
| 9,154,713 B2 | 10/2015 | Denham | |
| 9,407,847 B2 | 8/2016 | Maehashi | |
| 2010/0265374 A1* | 10/2010 | Nishi | H03M 1/0678 348/302 |
| 2011/0037868 A1* | 2/2011 | Ota | H04N 5/357 348/222.1 |
| 2015/0249797 A1* | 9/2015 | Yui | H04N 5/3575 250/208.1 |
| 2015/0319393 A1* | 11/2015 | Sato | H04N 5/378 348/322 |
| 2015/0341580 A1 | 11/2015 | Yamazaki | |
| 2016/0006969 A1* | 1/2016 | Matsumoto | H04N 5/357 348/308 |

* cited by examiner

US 9,986,194 B2

SOLID STATE IMAGING DEVICE AND IMAGING SYSTEM

BACKGROUND OF THE INVENTION

Field of the Invention

The present invention relates to a solid state imaging device and an imaging system.

Description of the Related Art

Masahide GOTO, et al., "Three-Dimensional Integrated CMOS Image Sensors with Pixel-Parallel Signal Processors," The Institute of Image Information and Television Engineers (ITE) technical report), Vol. 39, No. 16, pp. 5-8, March 2015 discloses a configuration of a solid state imaging device that has a plurality of pixels each including a photodiode, and an Analog-to-Digital (AD) conversion circuit is provided to each of the photodiodes. The AD conversion circuit includes an inverter, a reset transistor, and a counter. When the voltage of the photodiode exceeds a threshold voltage of the inverter, the output voltage is inverted and the voltage of the photodiode is reset. A digital signal in accordance with the amount of an incident light is obtained by counting the number of pulses of the output signal by using the counter.

However, when an object is of low brightness, for example, the voltage of the photodiode may not reach the threshold voltage of the inverter within a predetermined AD conversion period and no pulse may be counted. Therefore, the solid state imaging device of the above-described reference is likely to suffer from an insufficient gradation property for a low-brightness object.

SUMMARY OF THE INVENTION

According to one embodiment of the present invention, provided is a solid state imaging device including a first photoelectric conversion unit configured to generate a signal in accordance with an incident light by photoelectric conversion; a first transfer unit configured to transfer the signal from the first photoelectric conversion unit; a ramp wave generating unit that has an input node to which the signal is transferred and configured to generate a ramp wave whose voltage changes with time at a slope in accordance with a potential of the input node; a detection unit configured to detect a change in a relationship between a voltage of the ramp wave and a threshold voltage; a ramp wave reset unit configured to reset the voltage of the ramp wave when the detection unit detects a change in the relationship between the voltage of the ramp wave and the threshold voltage; a control unit configured to cause the detection unit to repeatedly detect a change in the relationship between the voltage of the ramp wave and the threshold voltage by repeating generation of the ramp wave by the ramp wave generating unit and the reset by the ramp wave reset unit within a predetermined period; and a digital value acquisition unit configured to acquire a digital value corresponding to the number of repetitions for which a change in the relationship between the voltage of the ramp wave and the threshold voltage is detected by the detection unit within the predetermined period.

Further features of the present invention will become apparent from the following description of exemplary embodiments with reference to the attached drawings.

DESCRIPTION OF THE EMBODIMENTS

Figure 1:
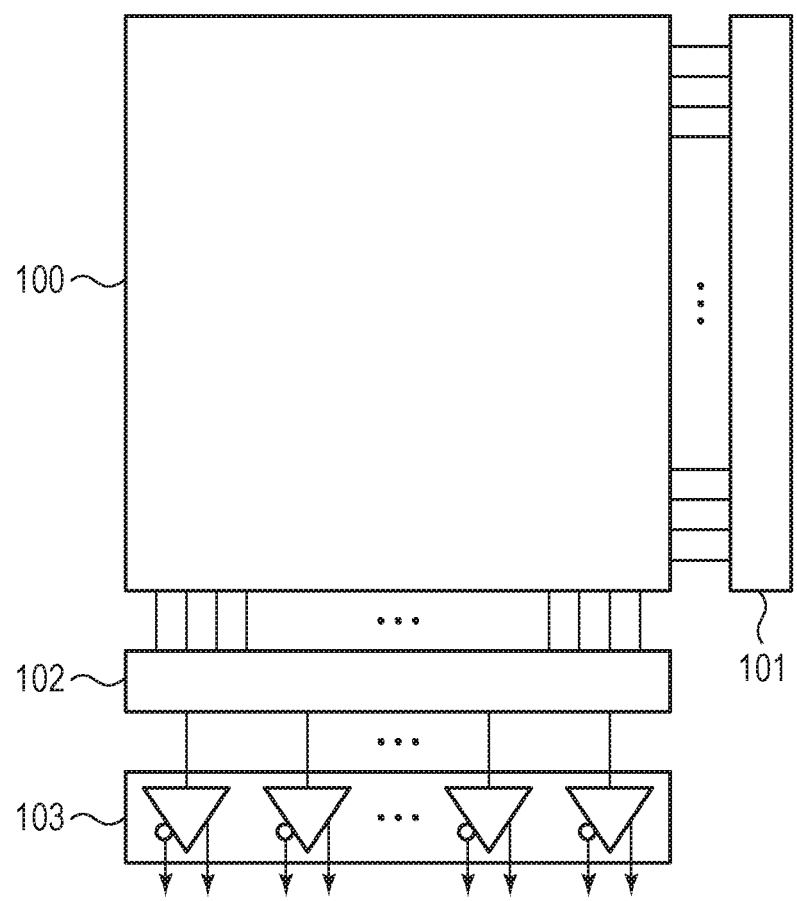
FIG. 1 is a block diagram of a solid state imaging device according to a first embodiment.

Preferred embodiments of the present invention will now be described in detail in accordance with the accompanying drawings. In each of the drawings, portions having the same function are labeled with the same reference numerals, and the description thereof may be omitted or simplified.

First Embodiment

A first embodiment of the present invention will be described. FIG. 1 is a block diagram of a solid state imaging device according to the present embodiment. The solid state imaging device according to the present embodiment includes a pixel array 100 including a plurality of pixels arranged in a two-dimensional manner with a plurality of rows and a plurality of columns, a vertical scanning circuit 101, a digital frontend circuit (hereafter, referred to as DFE) 102, and an interface circuit 103. The pixel array 100 includes a plurality of pixels aligned so as to form a plurality of rows and a plurality of columns. The vertical scanning circuit 101 outputs control signals on a row basis to each pixel of the pixel array 100. Signals output on a column basis from the pixel array 100 are input to the DFE 102. The DFE 102 is a digital signal processing circuit that performs predetermined signal processing such as correction, sorting, or the like on the input signals and outputs the processed signals. The interface circuit 103 is an interface that exchanges signals between the solid state imaging device and the outside thereof. As illustrated in FIG. 1, the interface circuit 103 may include, for example, a plurality of drive circuits for performing differential output. The signals processed by the DFE 102 are output via the interface circuit 103 to an imaging system on which the solid state imaging device is mounted.

Figure 2:
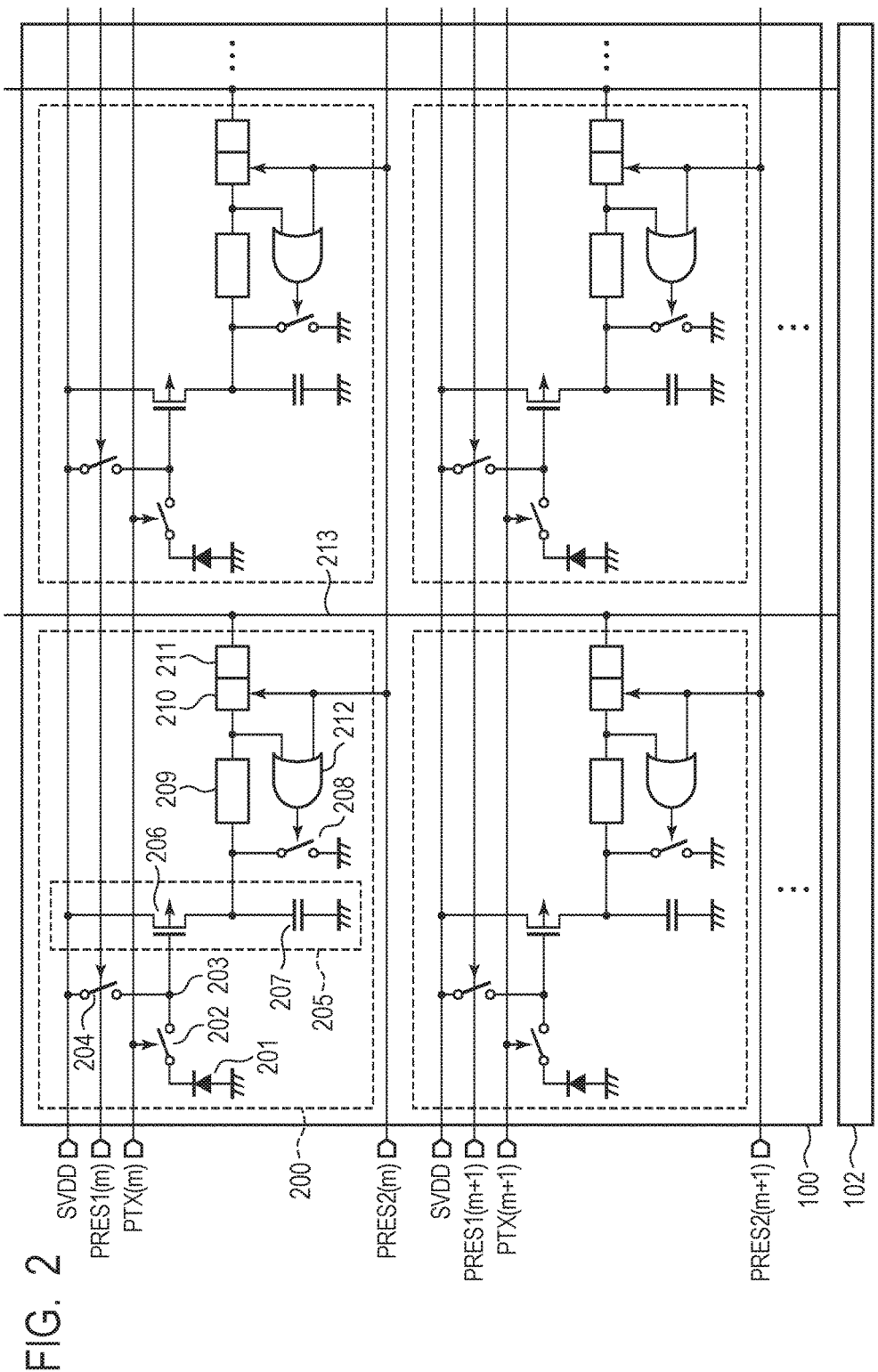
FIG. 2 is a circuit diagram of pixels according to the first embodiment.

FIG. 2 is a circuit diagram illustrating a configuration of pixels 200 arranged in a two-dimensional matrix within the pixel array 100. Each of the pixels 200 has a photodiode (hereafter, referred to as PD) 201, a transfer switch 202, a floating diffusion (hereafter, referred to as FD) 203, and an FD reset switch 204. Furthermore, the pixel 200 has a ramp wave generating unit 205, a ramp wave reset switch 208, a detection unit 209, a counter 210, a memory 211, and a ramp wave reset control unit 212 as an AD conversion circuit. That is, the solid state imaging device according to the present embodiment has the AD conversion circuit in each pixel 200, which enables each pixel 200 to output a digital signal.

Each of the transfer switch 202, the FD reset switch 204, and the ramp wave reset switch 208 may be formed of a metal oxide semiconductor (MOS) transistor, for example. The transfer switch 202 is controlled to be in a conductive state or a non-conductive state by a control signal PTX(m) output from the vertical scanning circuit 101. The FD reset switch 204 is controlled to be in a conductive state or a non-conductive state by a control signal PRES1(m) output from the vertical scanning circuit 101. The ramp wave reset switch 208 is controlled to be in a conductive state or a non-conductive state by an output signal of the ramp wave reset control unit 212. Note that the argument provided to each control signal denotes a row number of a pixel.

The PD 201 (the first photoelectric conversion unit) is a photoelectric conversion element that generates and accumulates charges (a signal) in accordance with an incident light by photoelectric conversion. The anode of the PD 201 is grounded, and the cathode thereof is connected to one terminal of the transfer switch 202. The other terminal of the transfer switch 202 is connected to the FD 203. In response to the transfer switch 202 entering a conductive state by the control signal PTX(m), the transfer switch 202 (the first transfer unit) transfers charges accumulated in the PD 201 to the FD 203. Further, one terminal of the FD reset switch 204 is connected to the FD 203. A pixel reset voltage SVDD is applied to the other terminal of the FD reset switch 204. In response to the FD reset switch 204 entering a conductive state by the control signal PRES1(m), the potential of the FD 203 is reset. In the present embodiment, charges generated by the PD 201 and transferred to the FD 203 are electrons. When electrons are transferred to the FD 203, the potential of the FD 203 decreases. However, charges generated by the PD 201 and transferred to the FD 203 may be holes. In this case, when holes are transferred to the FD 203, the potential of the FD 203 increases. By taking such a difference into consideration to read each circuit diagram, timing chart, or the like accordingly, it is appreciated that the present invention can be applied to the case where charges are holes as described above.

The FD 203 also functions as an input node of the ramp wave generating unit 205. The ramp wave generating unit 205 has a transistor 206 and an integration capacitor 207. The transistor 206 (the first transistor) is a P-type MOS transistor and functions as a voltage control current source in which the source-drain current is controlled based on the voltage of the gate terminal. The integration capacitor 207 (the first capacitor element) is a capacitor element that accumulates charges by a current supplied from the transistor 206 and converts the accumulated charges into a voltage. The FD 203 is connected to the gate of the transistor 206. A predetermined voltage is applied to the source of the transistor 206. Although FIG. 2 illustrates application of the pixel reset voltage SVDD, the embodiment is not limited thereto. The drain of the transistor 206 is connected to the first terminal of the integration capacitor 207, and the second terminal of the integration capacitor 207 is grounded. A node to which the drain of the transistor 206 and the first terminal of the integration capacitor 207 are connected functions as an output node of the ramp wave generating unit 205.

The transistor 206 supplies a current in accordance with the voltage of the input node of the ramp wave generating unit 205 to the first terminal of the integration capacitor 207. This current causes the voltage occurring in the integration capacitor 207 to be substantially linear in the initial period of charging with respect to time during which a current is supplied. Therefore, the signal output from the output node of the ramp wave generating unit 205 is a ramp wave whose voltage changes with time at a slope in accordance with the potential of the input node. This ramp wave is input to the detection unit 209.

The detection unit 209 detects a change in a relationship between the voltage of a ramp wave and a threshold voltage. For example, a circuit such as a comparator, a Schmitt trigger circuit, or the like may be used for the detection unit 209. The output signal of the detection unit 209 is low level when the ramp wave voltage does not exceed the predetermined threshold voltage, and is high level when the ramp wave voltage exceeds the threshold voltage. That is, the output signal of the detection unit 209 turns from low level to high level at a timing when the ramp wave voltage exceeds the threshold voltage in the course of an increase with time and thereby the relationship between the ramp wave voltage and the threshold voltage changes. The output signal of the detection unit 209 is input to the ramp wave reset control unit 212 and the counter 210.

One terminal of the ramp wave reset switch 208 (the ramp wave reset unit) is further connected to the output node of the ramp wave generating unit 205. The ramp wave reset switch 208 is controlled in a conductive state or a non-conductive state based on the output signal of the ramp wave reset control unit 212. The other terminal of the ramp wave reset switch 208 is grounded.

The ramp wave reset control unit 212 may be formed of an OR circuit, for example. The output signal of the detection unit 209 is input to one input terminal of the ramp wave reset control unit 212. A control signal PRES2(m) is input to the other input terminal of the ramp wave reset control unit 212 from the vertical scanning circuit 101. That is, the output of the ramp wave reset control unit 212 is high level when at least one of the output signal of the detection unit 209 and the control signal PRES2(m) is high level, and the ramp wave reset switch 208 is in a conductive state. Otherwise, the ramp wave reset switch 208 is in a non-conductive state.

In response to the ramp wave voltage exceeding the threshold voltage and the output signal of the detection unit 209 being high level, the ramp wave reset control unit 212 outputs a high level signal to the ramp wave reset switch 208. Thereby, the ramp wave reset switch 208 is switched from a non-conductive state to a conductive state, and the potential of the output node of the ramp wave generating unit 205 is reset to the ground potential. In other words, the ramp wave reset switch 208 resets the ramp wave voltage when the detection unit 209 detects a change in the relationship between the ramp wave voltage and the threshold voltage. This operation causes the ramp wave voltage to be reset and be lower than the threshold voltage. Therefore, the output signal of the detection unit 209 turns from high level to low level, and the ramp wave reset control unit 212 outputs a low level signal to the ramp wave reset switch 208. Thereby, the ramp wave reset switch 208 again enters a non-conductive state, and reset of the output node of the ramp wave generating unit 205 is released. Then, the ramp wave voltage again increases with time, and the same operation is repeated in the subsequent time. That is, since the ramp wave voltage is reset every time exceeding the threshold voltage, the ramp wave has a sawtooth pulse waveform. The number of pulses within a predetermined period of the ramp wave is proportional to the slope of the ramp wave voltage.

The output signal of the detection unit 209 is a pulse wave that temporarily becomes high level every time the ramp wave voltage exceeds the threshold. That is, the number of pulses of the output signal of the detection unit 209 is the same as the number of the pulses of the ramp wave. The counter 210 counts the number of pulses generated by the detection unit 209 within a predetermined period. Thereby, it is, in effect, possible to count the number of pulses of the ramp wave within a predetermined period, that is, the number of repetitions for which a change in the relationship between the ramp wave voltage and the threshold voltage is detected by the detection unit 209 within a predetermined period. The counter 210 transfers, to a memory 211, a digital value (a count value) that is the result of the count. The memory 211 stores the digital value transferred from the counter 210. As discussed above, the digital value stored in the memory 211 is a value corresponding to the number of repetitions for which a change in the relationship between the ramp wave voltage and the threshold voltage is detected by the detection unit 209 within a predetermined period. This corresponds to a value obtained by AD-converting the charge amount generated by the PD 210. In such a way, the counter 210 and the memory 211 function as a digital value acquisition unit that acquires a digital value corresponding to the number of repetitions for which a change in the relationship between the ramp wave voltage and the threshold voltage is detected by the detection unit 209 within a predetermined period. The count value held in the memory 211 is transferred to the DFE 102 via data transfer lines 213 arranged on a column basis of the pixel array 100.

Note that the counter 210 may directly count the number of pulses of a ramp wave instead of the output of the detection unit 209. Further, acquisition of the digital value may be configured in any way as long as the number of pulses of a ramp wave can be acquired directly or indirectly, and the present embodiment is not limited to the configuration using the counter 210 and the memory 211.

Figure 3:
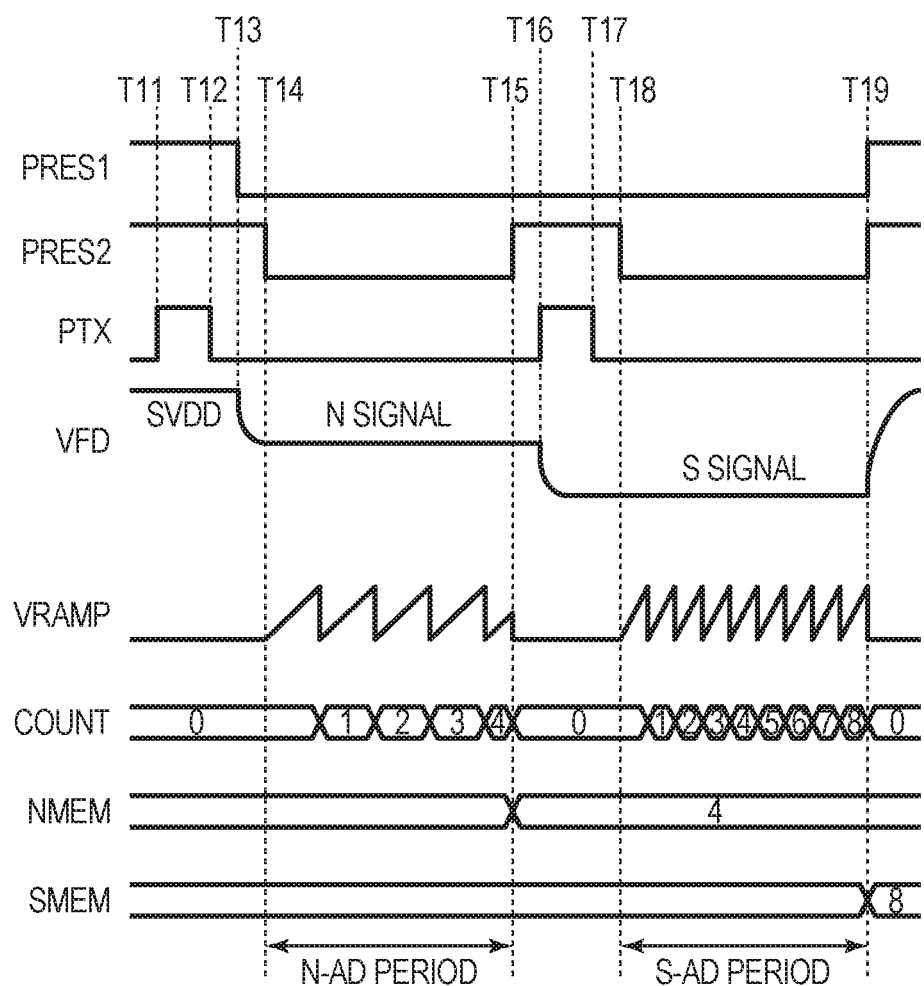
FIG. 3 is a timing chart according to the first embodiment.

FIG. 3 is a timing chart illustrating operation of the solid state imaging device of the present embodiment. FIG. 3 illustrates the control signals PRES1, PRES2, PTX, an FD voltage VFD of the FD 203, a ramp wave voltage VRAMP, a count value COUNT, and digital values stored in an N data storage area NMEM and an S data storage area SMEM within the memory 211. Note that the timing chart of FIG. 3 illustrates the operation timing on a certain row of the pixel array 100, and the row number of each control signal is omitted. Although operation on a particular row only of the pixel array 100 will be focused on and illustrated in the following description, the operation of FIG. 3 may be performed simultaneously on all the rows, or the operation of FIG. 3 may be performed sequentially on a row basis. In the case of simultaneous operation on all the rows, since exposure time is not different among rows, a capturing without a rolling shutter distortion will be possible.

In a period from the time T11 to the time T12, the control signals PRES1, PRES2, and PTX are high level, and the FD reset switch 204, the ramp wave reset switch 208, and the transfer switch 202 are set to a conductive state. This operation causes the PD 201 and the FD 203 to be reset to the pixel reset voltage SVDD, and the output of the ramp wave generating unit 205 is reset to the ground potential.

Then, the control signal PTX becomes low level at the time T12 and the control signal PRES 1 becomes low level at the time T13, and the transfer switch 202 and the FD reset switch 204 enter a non-conductive state. This operation causes the FD 203 to enter a floating state. At this time, due to influence of a noise caused by channel charge injection, clock feed-through occurring at the FD reset switch 204, or the like, the FD voltage VFD decreases to be less than the pixel reset voltage SVDD. The FD voltage VFD at this time is denoted as N signal.

At the time T14, the control signal PRES2 then becomes low level, and the ramp wave reset control unit 212 outputs a low level signal to the ramp wave reset switch 208. The ramp wave reset switch 208 enters a non-conductive state, the voltage VRAMP of the ramp wave output by the ramp wave generating unit 205 starts increasing, and AD conversion of the N signal is started. As described above, the slope of the voltage VRAMP depends on the level of the N signal. In response to the voltage VRAMP exceeding a predetermined threshold voltage, the counter 210 increments the count value by one. Furthermore, the voltage VRAMP is reset to the ground potential, and the voltage VRAMP then increases again. This operation is then repeated until the time T15 at which the AD conversion of the N signal ends.

As discussed above, the operation of the control signal PRES2 output from the vertical scanning circuit 101 turning to low level triggers a start of operation of repeating generation and reset of the ramp wave. In other words, the vertical scanning circuit 101 functions as a control unit that starts operation of repeating generation of a ramp wave by the ramp wave generating unit 205 and reset thereof by the ramp wave reset switch 208 within a predetermined period. As a result, the vertical scanning circuit 101 enables the detection unit 209 to start operation of repeatedly detecting a change in the relationship between the ramp wave voltage and the threshold voltage described above.

At the time T15, in response to the control signal PRES2 being high level, the counter 210 transfers the count value at that time (four in FIG. 3) to the memory 211 and stores the count value in the N data storage area NMEM of the memory 211. The counter 210 resets the count value to zero accordingly. The value stored in the N data storage area NMEM is a digital value corresponding to the N signal. A period from the time T14 at which the control signal PRES2 becomes low level to the time T15 at which it again becomes high level, that is, an AD conversion period of the N signal is denoted as N-AD period.

At the time T16, the control signal PTX then becomes high level, and the transfer switch 202 enters a conductive state. This operation causes charges accumulated in the PD 201 to be transferred to the FD 203, and the FD voltage VFD decreases. The FD voltage VFD at this time is denoted as S signal. At the time T17, the control signal PTX becomes low level, and the transfer switch 202 enters a non-conductive state. Thereby, transfer of charges ends.

In a period from the time T18 to the time T19, the control signal PRES2 is low level, and AD conversion of the S signal is performed in a similar process to that in the N-AD period. This causes a digital value corresponding to the S signal (eight in FIG. 3) to be stored in the S data storage area SMEM of the memory 211. A period from the time T18 at which the control signal PRES2 becomes low level to the time T19 at which it again becomes high level, that is, an AD conversion period of the S signal is denoted as S-AD period. At the time T19, the process of AD-converting the N signal and the S signal and storing the AD-converted signals in the memory 211 ends.

Since the S signal has a lower voltage than the N signal does, the slope of the ramp wave voltage VRAMP in accordance with the level of the S signal is larger than the slope of the ramp wave voltage VRAMP in accordance with the level of the N signal. Therefore, the number of pulses within a predetermined period output from the detection unit 209 to the counter 210 in the S-AD period is larger than that in the N-AD period. Therefore, the AD conversion result of the S signal is larger than the AD conversion result of the N signal.

The AD conversion result of the S signal contains an optical signal, which is a signal component of charges generated in the PD 201 by photoelectric conversion, and the N signal, which is a noise component generated from the FD reset switch 204 or the like. Thus, in order to reduce influence of the noise, a process of subtracting the N signal from the S signal (S-N process) may be performed in the memory 211 or the DFE 102. The S-N process allows for obtaining an optical signal that is less influenced by noise. For example, in the case of the example illustrated in FIG. 3, since the AD conversion value of the N signal is four while the AD conversion value of the S signal is eight, the AD conversion value of the optical signal obtained by the S-N process is four that equals to 8-4.

The slope of the ramp wave voltage VRAMP depends not only on the FD voltage but also on the transconductance gm of the transistor 206 and the capacitance of the integration capacitor 207. More specifically, since an increase of the transconductance gm of the transistor 206 results in a larger current supplied to the integration capacitor 207, the slope of the ramp wave voltage VRAMP increases. Further, since a reduction of the capacitance of the integration capacitor 207 results in a larger variation of the voltage between terminals of the integration capacitor 207 with respect to a constant supply current, the slope of the ramp wave voltage VRAMP increases.

As discussed above, a larger slope of the ramp wave voltage VRAMP can be obtained by increasing the transconductance gm of the transistor 206 or reducing the capacitance of the integration capacitor 207, which can improve the gradation property for an object with a low brightness. Further, both increase of the transconductance gm of the transistor 206 and reduction of the capacitance of the integration capacitor 207 may be used to increase the slope of the ramp wave voltage VRAMP. Note that the transconductance gm of the transistor 206 can be increased by design which increases the aspect ratio (gate width/gate length) of the gate electrode of the transistor 206 or design which reduces the threshold voltage Vth. For example, when the integration capacitor 207 is a capacitor element of a parallel plane type with the structure in which two electrodes interpose a dielectric film a smaller capacitance thereof can be obtained by reducing the area of the electrodes or increasing the thickness of the dielectric film.

Note that, although FIG. 2 illustrates that the pixel reset voltage SVDD is applied to both the terminal of the FD reset switch 204 on the opposite side of the FD 203 and the source of the transistor 206, the voltages applied to respective terminals are not required to be the same. For example, the voltage applied to the source of the transistor 206 may be higher than the pixel reset voltage SVDD so that the gate-source voltage Vgs of the transistor 206 is able to exceed the threshold voltage Vth of the transistor 206 in the N-AD period in a more reliable manner.

In the present embodiment, it is not required for the counter 210 and the memory 211 to be separately provided, the function of digital value acquisition may be implemented by a single device. For example, the counter 210 may be an up-down counter and the memory 211 may be omitted. In this case, the AD conversion value of an optical signal can be obtained by performing down-count in the N-AD period and up-count in the S-AD period.

The timing chart illustrated in FIG. 3 is an example of the embodiment, and the operation timing may be properly modified as long as the AD conversion operation is successfully performed.

As a modified example of the present embodiment, such a configuration is also possible that the cathode of the PD 201 is directly connected to the FD 203 without providing the transfer switch 202. In this configuration, however, charges generated by the PD 201 flow into the FD 203 during a period of performing AD conversion, which causes fluctuation of the potential of the FD 203. This may cause a reduction in the linearity between charges transferred to the FD 203 and the digital value obtained by the AD conversion. As illustrated in FIG. 2, the transfer switch 202 is provided between the PD 201 and the FD 203 so that charges do not flow into the FD during an AD conversion period, and thereby the potential of the FD 203 during the AD conversion period is stabilized, which enables AD conversion with a good linearity.

Second Embodiment

A second embodiment of the present invention will be described. A solid state imaging device according to the present embodiment is the same as the solid state imaging device according to the first embodiment described above except the configuration of a ramp wave generating unit. The ramp wave generating unit that makes a difference from the first embodiment will be mainly described below with comparison to the first embodiment. Description of the portions having the same configuration as in the first embodiment will be omitted or simplified.

Figures 4A, 4B, 4C:
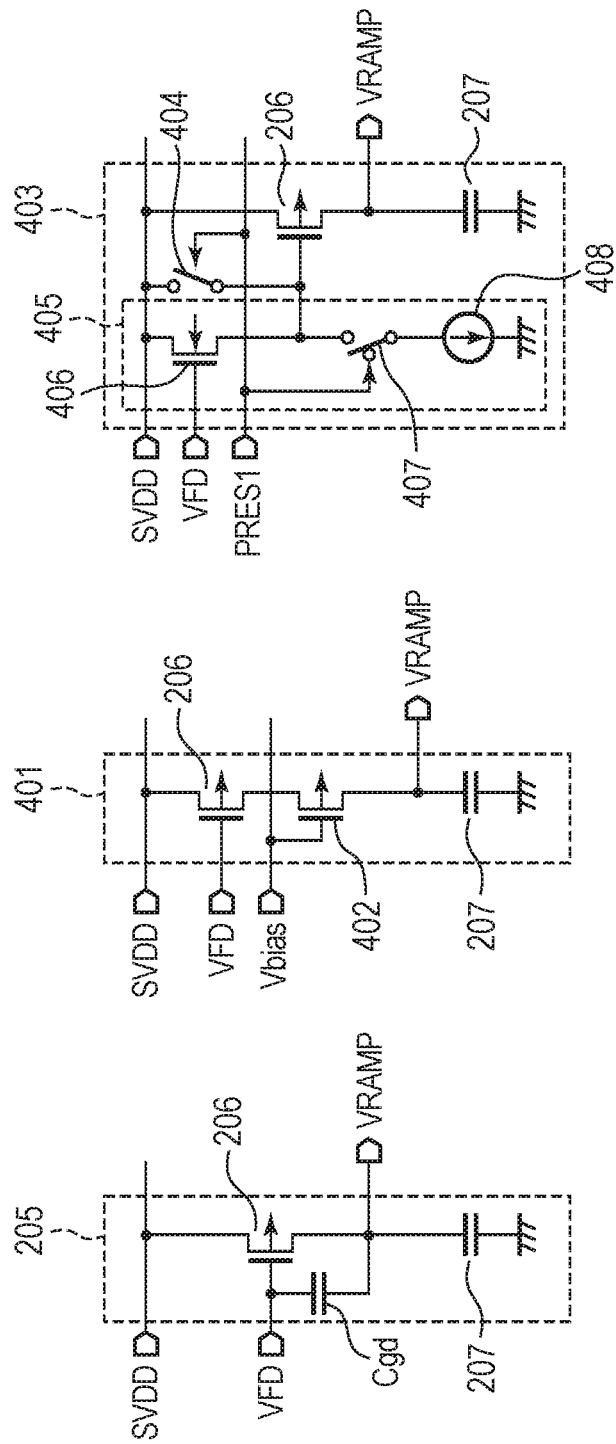
FIG. 4A, FIG. 4B, and FIG. 4C are circuit diagrams of a ramp wave generating unit according to the first and second embodiments.

FIG. 4A is an equivalent circuit diagram of a ramp wave generating unit 205 according to the first embodiment. FIG. 4A depicts a parasitic capacitor Cgd as an equivalent capacitor that occurs between the gate and the drain of the transistor 206 in the ramp wave generating unit 205 illustrated in FIG. 2.

The capacitance of the FD 203 is typically minute such as around few fF. Therefore, the capacitance of the parasitic capacitor Cgd cannot be ignored with respect to the capacitance of the FD 203, and a change in the ramp wave voltage VRAMP may influence the FD voltage VFD via the parasitic capacitor Cgd. Thus, the solid state imaging device according to the present embodiment is configured to reduce influence on the FD voltage VFD caused by a change in the ramp wave voltage VRAMP. An exemplary configuration will be described below with reference to FIG. 4B and FIG. 4C.

FIG. 4B is a circuit diagram illustrating a configuration of a ramp wave generating unit 401 according to the second embodiment. The ramp wave generating unit 401 further has a transistor 402 (the second transistor) between the transistor 206 and the output node of the ramp wave generating unit 205 in addition to the configuration of the ramp wave generating unit 205 according to the first embodiment. The transistor 402 is a P-type MOS transistor. The source of the transistor 402 is connected to the drain of the transistor 206, and the drain of the transistor 402 is connected to the output node of the ramp wave generating unit 401. A bias voltage Vbias is applied to the gate of the transistor 402 from a bias voltage source (not shown). That is, the transistor 402 is cascode-connected between the transistor 206 and the output node of the ramp wave generating unit 401. With the transistor 402 being arranged between them, the voltage change at the drain terminal of the transistor 206 due to a change in the ramp wave voltage VRAMP is reduced. Therefore, the influence on the FD voltage VFD via the parasitic capacitor Cgd is also reduced.

FIG. 4C is a circuit diagram illustrating a configuration of the ramp wave generating unit 403 as another exemplary configuration of the second embodiment. The ramp generating unit 403 has a switch 404 and a buffer 405 in addition to the configuration of the ramp wave generating unit 205 according to the first embodiment. The buffer 405 has a transistor 406, a switch 407, and a current source 408. The transistor 406 is an N-type MOS transistor. The switch 404 and the switch 407 are controlled by the control signal PRES1. When the control signal PRES1 is high level, the switch 404 is in a conductive state and the switch 407 is in a non-conductive state. When the control signal PRES1 is low level, the switch 404 is in a non-conductive state and the switch 407 is in a conductive state.

One terminal of the switch 404 is connected to the gate of the transistor 206, and the pixel reset voltage SVDD is applied to the other terminal of the switch 404. The pixel reset voltage SVDD is applied to the drain of the transistor 406. The gate of the transistor 406 is the input terminal of the buffer 405 and also is the input node of the ramp wave generating unit 205. That is, the gate of the transistor 406 is connected to the FD 203, and the FD voltage VFD is applied thereto. The source of the transistor 406 is the output terminal of the buffer 405 and is connected to the gate of the transistor 206 and one terminal of the switch 407. The other terminal of the switch 407 is connected to the current source 408.

In the N-AD period and the S-AD period, since the control signal PRES1 is low level, the switch 404 is in a non-conductive state and the switch 407 is in a conductive state, and thus the buffer 405 is a source-follower circuit. That is, the buffer 405 has a function of buffering the potential of the input node of the ramp wave generating unit 403 and inputting the output potential to the gate of the transistor 206. With the buffer 405 being provided between the FD 203 and the gate of the transistor 206, influence on the FD voltage VFD via the parasitic capacitor Cgd caused by the ramp wave voltage VRAMP can be reduced.

Note that, in the ramp wave generating unit of the present embodiment, portions changed from the first embodiment can be applied in a similar manner to the ramp wave generating unit configured according to other embodiments.

Third Embodiment

A third embodiment of the present invention will be described. A solid state imaging device according to the present embodiment is the same as the solid state imaging device according to the first embodiment described above except the configuration of the pixel. The pixel that makes a difference from the first embodiment will be mainly described below, and description of the portions having the same configuration as in the first embodiment will be omitted or simplified.

Figure 5:
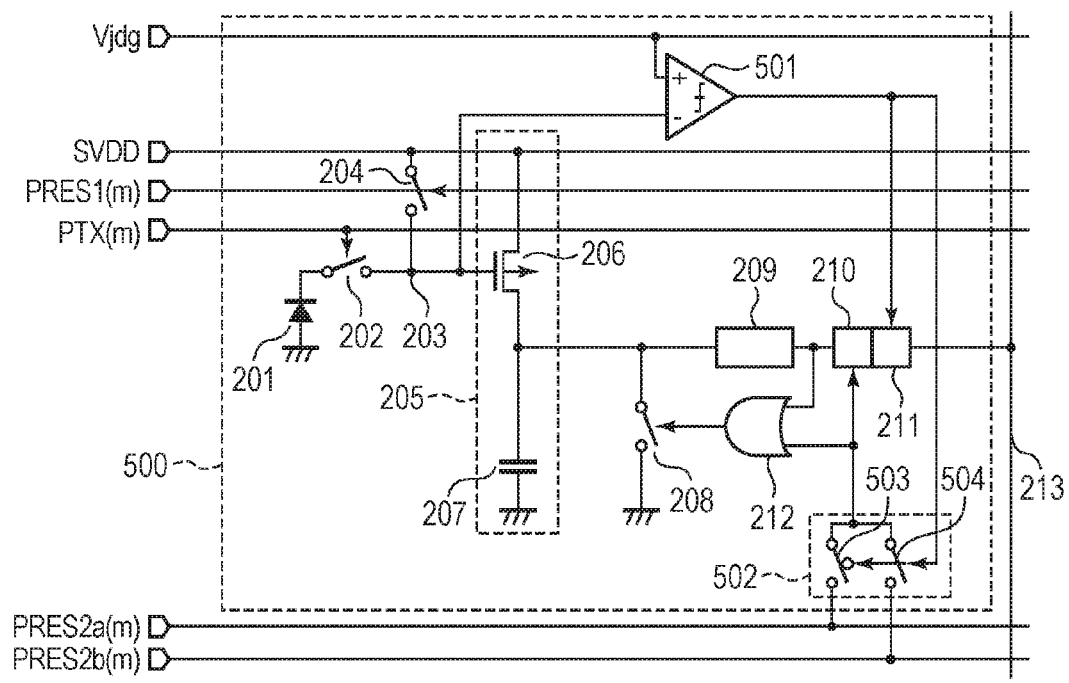
FIG. 5 is a circuit diagram of a pixel according to a third embodiment.

FIG. 5 is a circuit diagram illustrating a configuration of a pixel 500 according to the present embodiment. The pixel 500 according to the present embodiment further has a comparator 501 and a reset signal switch unit 502 in addition to the components of the pixel 200 of the first embodiment. The reset signal switch unit 502 has switches 503 and 504. A brightness determination voltage Vjdg is input to the non-inverting input terminal of the comparator 501. The inverting input terminal of the comparator 501 is connected to the FD 203. The brightness determination voltage Vjdg is set to a lower voltage than the FD voltage VFD corresponding to the N signal. The signal output from the comparator 501 is input to the memory 211 and the reset signal switch unit 502. That is, the comparator 501 compares the FD voltage VFD with the brightness determination voltage Vjdg and controls the memory 211 and the reset signal switch unit 502 in accordance with the comparison result.

The signal from the comparator 501 input to the reset signal switch unit 502 serves as a control signal of the switches 503 and 504. When the signal output from the comparator 501 is low level, the switch 503 is in a conductive state and the switch 504 is in a non-conductive state. Thereby, a control signal PRES2a for low brightness is input to the counter 210. When the signal output from the comparator 501 is high level, the switch 503 is in a non-conductive state and the switch 504 is in a conductive state. Thereby, a control signal PRES2b for high brightness is input to the counter 210. The control signal PRES2b has a shorter low-level period corresponding to the S-AD period than the control signal PRES2a does.

Based on the comparison result by the comparator 501, the reset signal switch unit 502 is configured to select the control signal PRES2a for low brightness when VFD is higher than or equal to Vjdg and select the control signal PRES2b for high brightness when VFD is lower than Vjdg. Therefore, the comparator 501 and the reset signal switch unit 502 function as a count period switch unit that changes a period in which the counter 210 acquires a count value based on the FD voltage VFD, that is, the potential of the input node of the ramp wave generating unit 205.

The comparison result output from the comparator 501 and input to the memory 211 is stored in the memory 211 and used for determination as to whether or not to weight the AD conversion value of the S signal.

Figure 6:
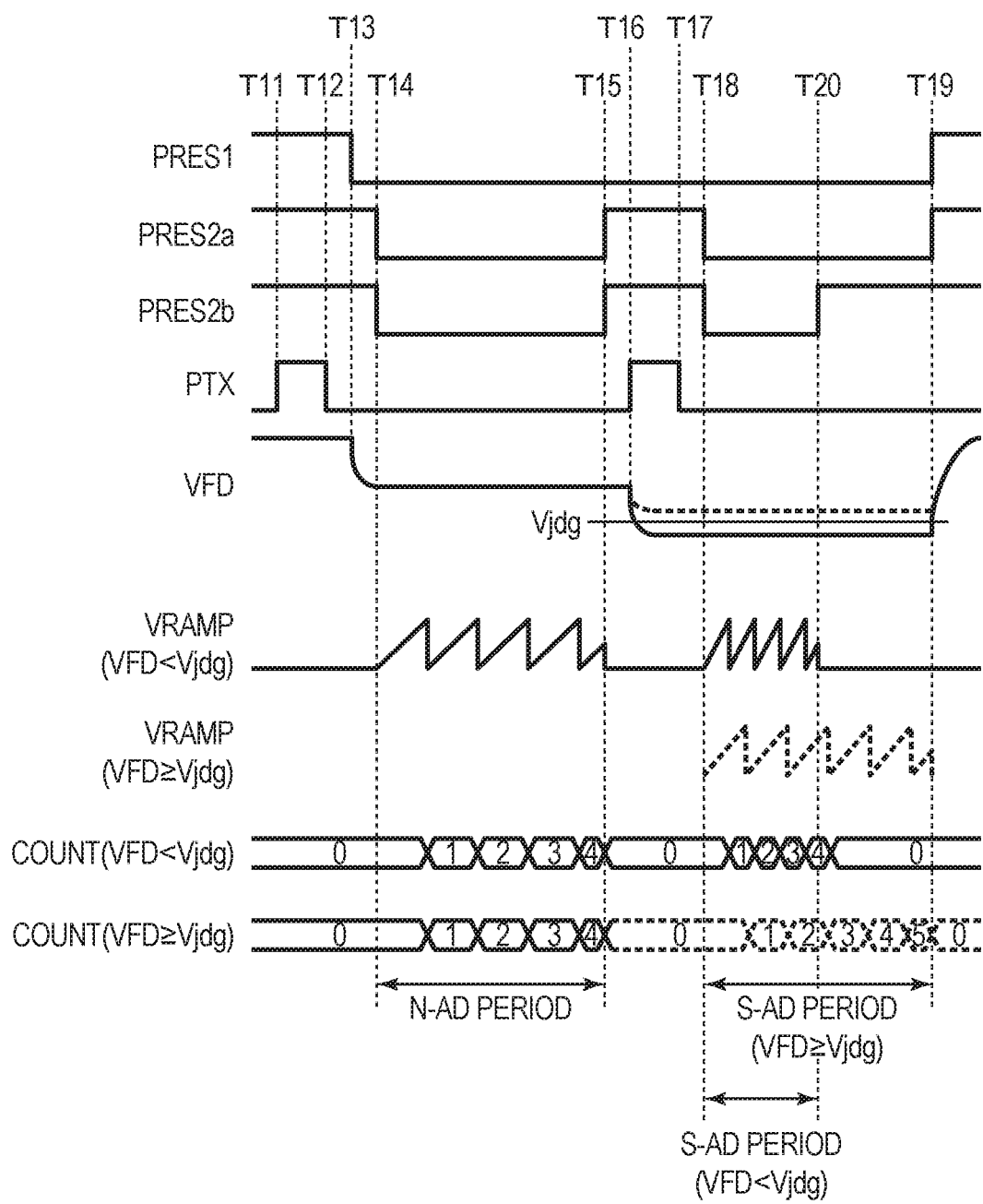
FIG. 6 is a timing chart according to the third embodiment.

FIG. 6 is a timing chart illustrating operation of the solid state imaging device of the present embodiment. The timing chart of the present embodiment is different from the timing chart of FIG. 3 of the first embodiment in terms of the operation in the S-AD period. In the S-AD period, such operation is performed that is different between a case where a light entering the PD 201 has low brightness, that is, the FD voltage VFD is higher than or equal to the brightness determination voltage Vjdg (broken line) and a case of high brightness, that is, the FD voltage VFD is lower than the brightness determination voltage Vjdg (solid line). When the FD voltage VFD is higher than or equal to the brightness determination voltage Vjdg, the control signal PRES2a is input to the counter 210, and a period from the time T18 to the time T19 corresponds to the S-AD period. That is, the same operation as that in FIG. 3 of the first embodiment is performed. When the FD voltage VFD is lower than the brightness determination voltage Vjdg, the control signal PRES2b is input to the counter 210, and a period from the time T18 to the time T20 serves as the S-AD period. In such a way, the S-AD period in the case of high brightness is shorter than that in the case of low brightness. This allows for a reduction in the number of pulses and thus a reduction in power consumption. As discussed above, in the present embodiment, the S-AD period is shortened only in the case of high brightness, which allows for a reduction in power consumption in the case of high brightness while maintaining the advantage of improving the gradation property for a low-brightness object.

Here, weighting operation that is required due to a change in the length of the S-AD period will be described. For example, it is assumed that the control signals PRES2*a* and PRES2*b* are set such that the length of the S-AD period at the time of high brightness is half the length of the S-AD period at the time of low brightness. In this case, with weighting operation of doubling the AD conversion value at the time of high brightness, the AD conversion value that corresponds to the actual brightness can be obtained. In the case of the example illustrated in FIG. 6, since the AD conversion value of the N signal is four while the AD conversion value of the S signal is five at the time of low brightness, the AD conversion value of the optical signal obtained by the S-N process is one that equals to 5-4. On the other hand, the AD conversion value of the N signal is four while the AD conversion value of the S signal is also four at the time of high brightness. Since the weighting operation of doubling the AD conversion value of the S signal is performed here, the AD conversion value of the optical signal obtained by the S-N process is four that equals to 4×2-4. In further generalization, when the length of the S-AD period at the time of high brightness is 1/p times the length of the S-AD period at the time of low brightness, weighting operation of multiplying the AD conversion value at the time of high brightness by p allows for obtaining an AD conversion value corresponding to the actual brightness.

Figure 7:
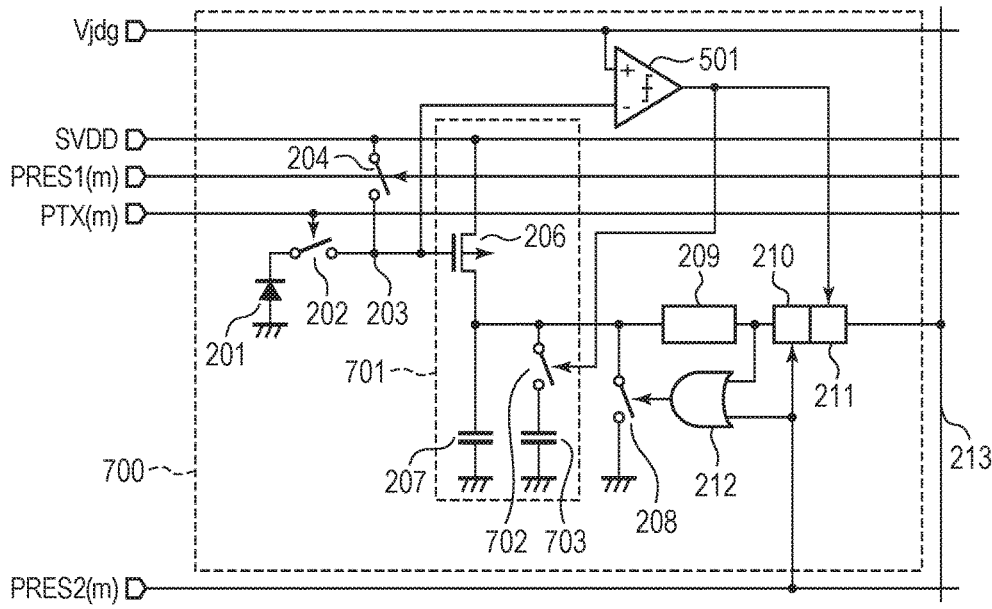
FIG. 7 is a circuit diagram of a pixel according to a modified example of the third embodiment.

A modified example of the present embodiment will be described with reference to FIG. 7 and FIG. 8. In this modified example, the same advantage as described above can be obtained by reducing the slope of the ramp wave voltage VRAMP instead of reducing the length of the S-AD period. FIG. 7 is a circuit diagram illustrating a configuration of a pixel 700 according to the modified example of the present embodiment. In this modified example, instead of the reset signal switch unit 502 of the pixel 500 of FIG. 5, a switch 702 and an integration capacitor 703 (the second capacitor element) are provided within a ramp wave generating unit 701. One terminal of the switch 702 is connected to the drain of the transistor 206, and the other terminal of the switch 702 is connected to one terminal of the integration capacitor 703. The other terminal of the integration capacitor 703 is grounded.

The switch 702 is controlled by the output signal of the comparator 501. The switch 702 is in a non-conductive state when the signal output from the comparator 501 is low level, and the switch 702 is in a conductive state when the signal output from the comparator 501 is high level. In response to the switch 702 entering a conductive state, the integration capacitor 703 is conducted to the drain of the transistor 206 and thus the integration capacitor 207 and the integration capacitor 703 are connected in parallel to provide an increased capacitance, which results in a reduced slope of the ramp wave voltage VRAMP. Therefore, the comparator 501 and the switch 702 function as a capacitor switch unit that changes the capacitor to be connected to the transistor 206 based on the FD voltage VFD, that is, the potential of the input node of the ramp wave generating unit 205 and thereby changes the slope of the ramp wave voltage VRAMP.

Figure 8:
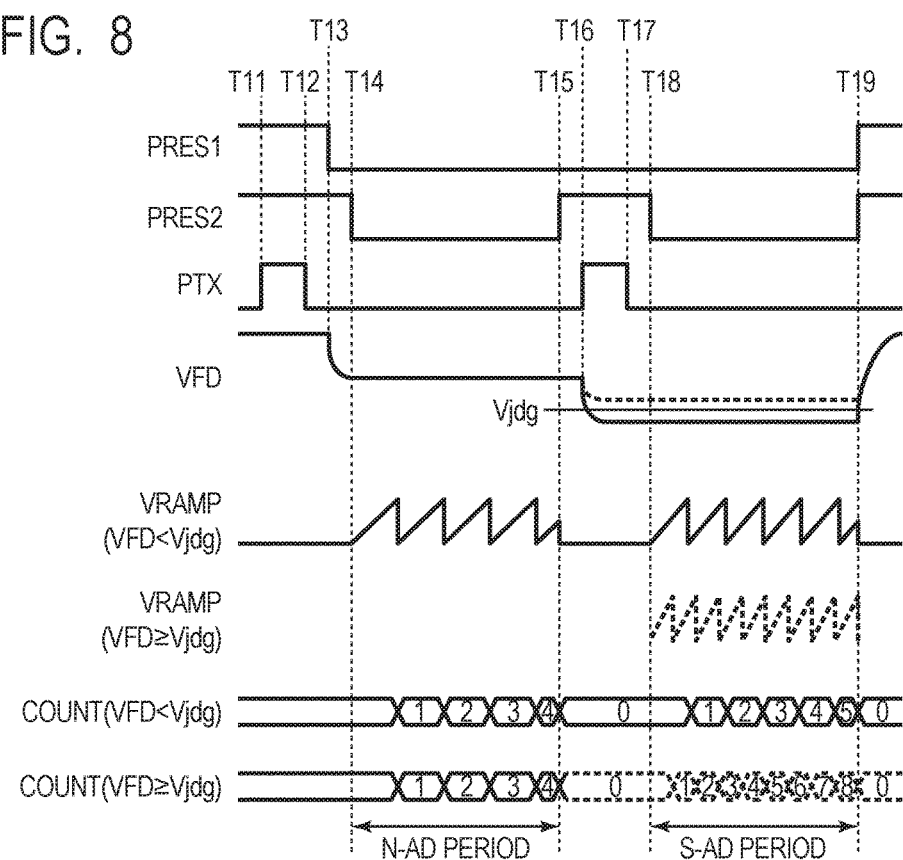
FIG. 8 is a timing chart according to the modified example of the third embodiment.

FIG. 8 is a timing chart illustrating operation of the solid state imaging device according to this modified example. When the FD voltage VFD is higher than or equal to the brightness determination voltage Vjdg, the signal output from the comparator 501 is low level and the switch 702 is in a non-conductive state causing the same operation as that in FIG. 3 of the first embodiment to be performed. When the FD voltage VFD is lower than the brightness determination voltage Vjdg, the signal output from the comparator 501 is high level and the switch 702 is in a conductive state, which results in a reduced slope of the ramp wave voltage VRAMP. Since a reduced slope of the ramp wave voltage VRAMP results in the reduced number of pulses, power consumption is reduced. In such a way, in this modified example, by reducing the slope of the ramp wave voltage VRAMP only in the case of high brightness, power consumption can be reduced in the case of high brightness while maintaining the advantage of improving the gradation property for a low-brightness object.

Here, weighting operation in this modified example will be described. In the present embodiment, the slope of the ramp wave voltage VRAMP decreases at the time of high brightness. Since this slope depends on the capacitance of the integration capacitor 207 and the capacitance of the integration capacitor 703, the AD conversion value is weighted with coefficients corresponding thereto. For example, when the ratio of the capacitances of the integration capacitor 207 and the integration capacitor 703 is 1:1, doubling the AD conversion value of the S signal at the time of high brightness for weighting operation allows for obtaining the AD conversion value corresponding to the actual brightness. Specifically, in the case of the example illustrated in FIG. 8, since the AD conversion value of the N signal is four while the AD conversion value of the S signal is eight at the time of low brightness, the AD conversion value of the optical signal obtained by the S-N process is four that equals to 8-4. On the other hand, the AD conversion value of the N signal is four while the AD conversion value of the S signal is also five at the time of high brightness. Since the weighting operation of doubling the AD conversion value of the S signal is then performed, the AD conversion value of the optical signal obtained by the S-N process is six that equals to 5×2-4. In further generalization, when the ratio of the capacitances of the integration capacitor 207 and the integration capacitor 703 is 1:q, weighting operation of multiplying the AD conversion value at the time of high brightness by (q+1) allows for obtaining an AD conversion value corresponding to the actual brightness.

Fourth Embodiment

A fourth embodiment of the present invention will be described. A solid state imaging device according to the present embodiment is the same as the solid state imaging device according to the first embodiment described above except the configuration and operation timing of the preceding stage of the ramp wave generating unit 205. Thus, portions which are different from the first embodiment will be described below, and description of the portions having the same configuration as in the first embodiment will be omitted or simplified.

Figure 9:
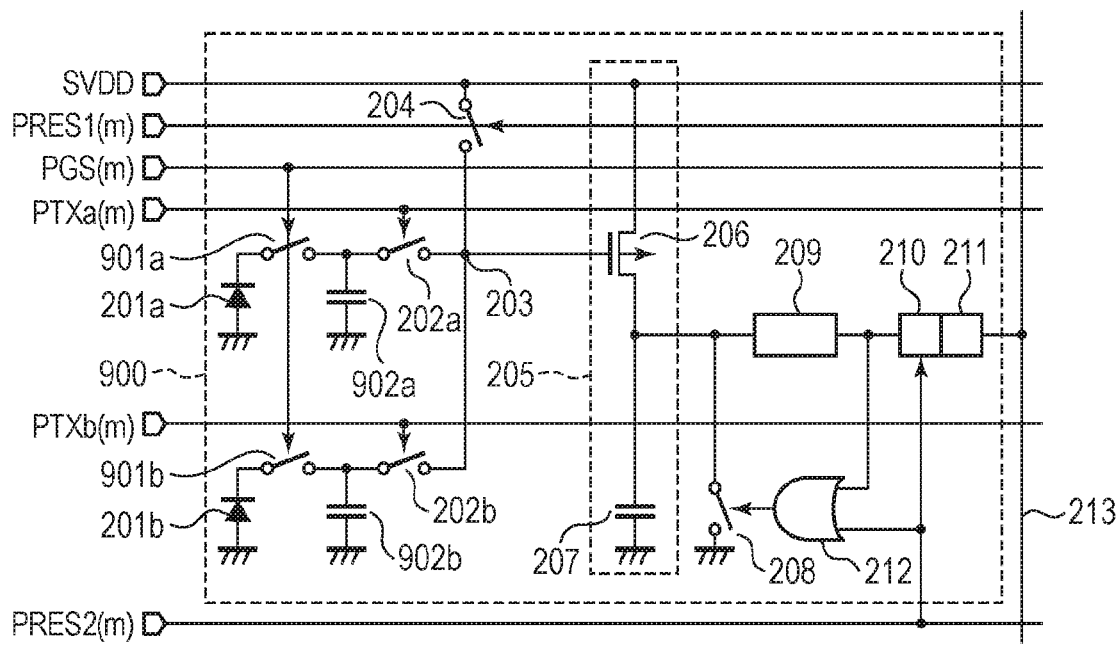
FIG. 9 is a circuit diagram of a pixel according to a fourth embodiment.

FIG. 9 is a circuit diagram illustrating a configuration of a pixel 900 according to the present embodiment. The pixel 900 of the present embodiment has two PDs within a single pixel and has a pixel configuration that enables global shutter operation in which the accumulation start time and the accumulation end time are matched in all the pixels. Thus, the pixel 900 has PDs 201a and 201b, holding capacitors 902a and 902b, and transfer switches 901a, 901b, 202a, and 202b. The transfer switches 901a and 901b are controlled to be in a conductive state or a non-conductive state by a control signal PGS(m) output from the vertical scanning circuit 101. The transfer switch 202a is controlled to be in a conductive state or a non-conductive state by a control signal PTXa(m) output from the vertical scanning circuit 101. The transfer switch 202b is controlled to be in a conductive state or a non-conductive state by a control signal PTXb(m) output from the vertical scanning circuit 101. Note that the capability of performing global shutter operation is not essential and, in such a case, the transfer switches 901a and 901b and the holding capacitors 902a and 902b may be omitted, for example.

The anode of the PD 201a (the first photoelectric conversion unit) is grounded and the cathode thereof is connected to one terminal of the transfer switch 901a (the first transfer unit). The other terminal of the transfer switch 901a is connected to one terminal of the holding capacitor 902a (the third capacitor element) and one terminal of the transfer switch 202a (the second transfer unit). The other terminal of the holding capacitor 902a is grounded. In response to the transfer switch 901a entering a conductive state by the control signal PGS(m), charges accumulated in the PD 201a are transferred to the holding capacitor 902a. The other terminal of the transfer switch 202a is connected to the FD 203. In response to the transfer switch 202a entering a conductive state by the control signal PTXa(m), charges accumulated in the holding capacitor 902a are transferred to the FD 203.

The anode of the PD 201b (the second photoelectric conversion unit) is grounded and the cathode thereof is connected to one terminal of the transfer switch 901b (the third transfer unit). The other terminal of the transfer switch 901b is connected to one terminal of the holding capacitor 902b (the fourth capacitor element) and one terminal of the transfer switch 202b (the fourth transfer unit). The other terminal of the holding capacitor 902b is grounded. In response to the transfer switch 901b entering a conductive state by the control signal PGS(m), charges accumulated in the PD 201b are transferred to the holding capacitor 902b. The other terminal of the transfer switch 202b is connected to the FD 203. In response to the transfer switch 202b entering a conductive state by the control signal PTXb(m), charges accumulated in the holding capacitor 902b are transferred to the FD 203.

Figure 10A:
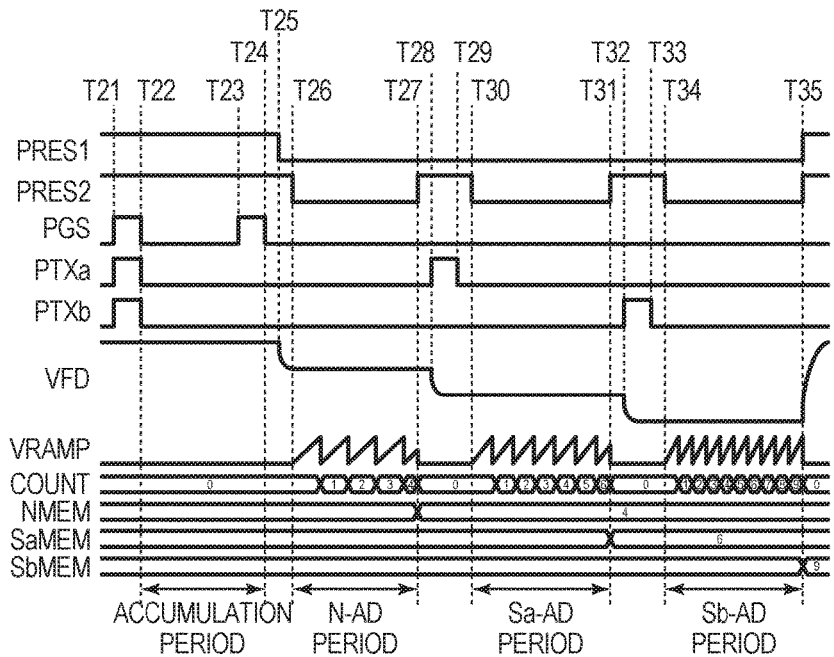
FIG. 10A and FIG. 10B are timing charts according to the fourth embodiment and a modified example thereof.

FIG. 10A is a timing chart illustrating operation of the solid state imaging device of the present embodiment. FIG. 10A depicts the control signals PRES1, PRES2, PGS, PTXa, PTXb, the FD voltage VFD, the ramp wave voltage VRAMP, and the count value COUNT. Furthermore, FIG. 10A depicts digital values stored in the N data storage area NMEM, an Sa data storage area SaMEM, and an Sb data storage area SbMEM, respectively. Note that the timing chart of FIG. 10A illustrates the operation timing on a certain row of the pixel array 900, and the row number of each control signal is omitted. While operation on a particular row only of the pixel array 900 will be focused on and described below, the operation of FIG. 10A is performed simultaneously on all the rows. Since exposure time is not different among rows, a capturing without a rolling shutter distortion is possible.

In a period from the time T21 to the time T22, all the control signals PRES1, PRES2, PGS, PTXa, and PTXb are high level. Thereby, the FD reset switch 204, the ramp wave reset switch 208, and the transfer switches 901a, 901b, 202a, and 202b enter a conductive state. This operation causes the PDs 201a and 201b, the holding capacitors 902a and 902b, and the FD 203 to be reset to the pixel reset voltage SVDD, and the output of the ramp wave generating unit 205 is reset to the ground potential.

At the time T22, the control signals PGS, PTXa, and PTXb become low level, and the transfer switches 901a, 901b, 202a, and 202b enter a non-conductive state. From the time T22, the PDs 201a and 201b start accumulation of charges generated due to an incident light.

Then, the control signal PGS becomes high level at the time T23, and the control signal PGS again becomes low level at the time T24. That is, the transfer switches 901a and 901b are in a conductive state in a period from the time T23 to the time T24, which causes charges accumulated in the PDs 201a and 201b to be transferred to the holding capacitors 902a and 902b, respectively. A period from the time T22 at which the PDs 201a and 201b start accumulation of charges to the time T24 at the end of transfer of charges to the holding capacitors 902a and 902b is denoted as accumulation period.

At the time T25, the control signal PRES1 then becomes low level, and the FD reset switch 204 enters a non-conductive state. At this time, the FD voltage VFD becomes a level of the N signal. Subsequently, at the time T26, the control signal PRES2 becomes low level, and the ramp wave reset switch 208 enters a non-conductive state. Thereby, the ramp wave voltage VRAMP starts increasing, and AD conversion of the N signal is started. In the N-AD period from the time T26 to the time T27 at which the control signal PRES2 becomes high level and the ramp wave reset switch 208 enters a non-conductive state, AD conversion of the N signal is performed in the same manner as in the first embodiment.

At the time T28, the control signal PTXa then becomes high level, and the transfer switch 202a enters a conductive state. This operation causes charges held in the holding capacitor 902a to be transferred to the FD 203, and the FD voltage VFD decreases. The FD voltage VFD at this time is denoted as Sa signal. At the time T29, the control signal PTXa becomes low level, and the transfer switch 202a enters a non-conductive state. Thereby, transfer of charges ends.

In a period from the time T30 to the time T31, the control signal PRES2 is low level, and AD conversion of the Sa signal is performed by the same process as that in the N-AD period. In a period from the time T30 at which the control signal PRES2 becomes low level to the time T31 at which it again becomes high level, that is, the AD conversion period of the Sa signal is denoted as Sa-AD period.

At the time T32, the control signal PTXb then becomes high level, and the transfer switch 202b enters a conductive state. This operation causes charges held in the holding capacitor 902b to be transferred to the FD 203, and the FD voltage VFD decreases. The FD voltage VFD at this time is denoted as Sb signal. At the time T33, the control signal PTXb becomes low level, and the transfer switch 202b enters a non-conductive state. Thereby, transfer of charges ends.

In a period from the time T34 to the time T35, the control signal PRES2 is low level, and AD conversion of the Sb signal is performed by the same process as that in the N-AD period and the Sa-AD period. A period from the time T34 at which the control signal PRES2 becomes low level to the time T35 at which it again becomes high level, that is, the AD conversion period of the Sb signal is denoted as Sb-AD period.

The AD conversion value of the Sa signal contains the N signal and a first optical signal that is the signal component of charges generated in the PD 201*a* by photoelectric conversion. The AD conversion value of the Sb signal contains the Sa signal and a second optical signal that is the signal component of charges generated in the PD 201*b* by photoelectric conversion. Thus, the AD conversion value of the first optical signal is obtained by acquiring the difference between the AD conversion value of the Sa signal and the AD conversion value of the N signal. Further, the AD conversion value of the second optical signal is obtained by acquiring the difference between the AD conversion value of the Sb signal and the AD conversion value of the Sa signal. Calculation of these differences is performed in the memory 211 or the DFE 102, for example.

According to the present embodiment, the same advantages as those in the first embodiment can be obtained even with the pixel configuration having two PDs within a single pixel. Further, global shutter operation is made possible in the pixel configuration having two PDs within a single pixel.

Figure 10B:
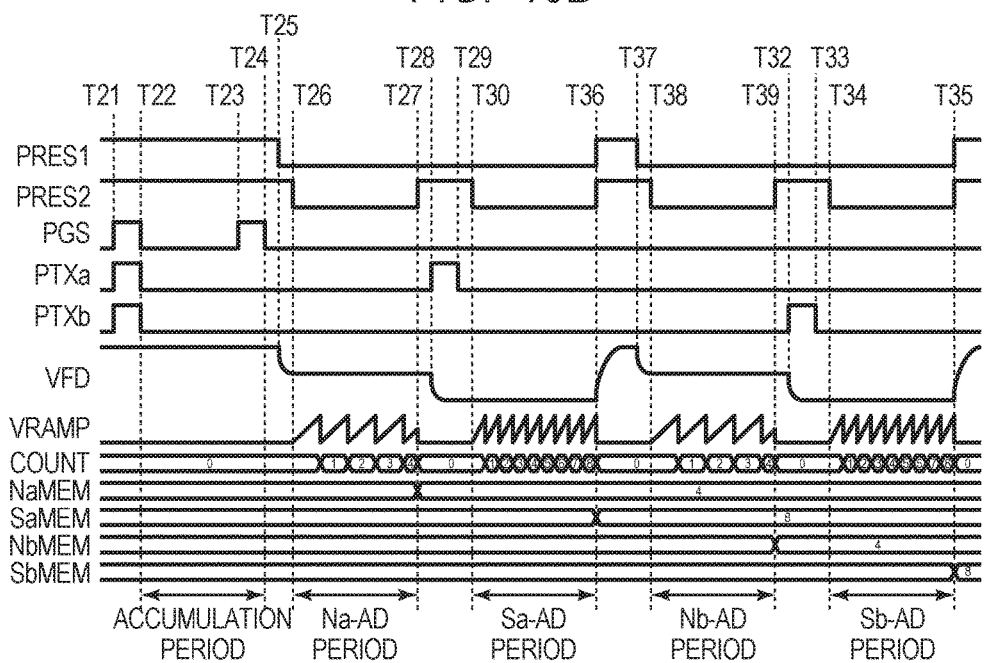

A modified example of the present embodiment will be described with reference to FIG. 10B. In the present embodiment, as illustrated in FIG. 10B, an Nb-AD period may be further added between the Sa-AD period and the Sb-AD period. In the timing chart illustrated in FIG. 10B, at the time T36 at which the Sa-AD period ends, and not only the control signal PRES2 but also the control signal PRES1 becomes high level. That is, the FD reset switch 204 and the ramp wave reset switch 208 enter a conductive state, and not only the ramp wave voltage VRAMP but also the FD voltage FD voltage VFD is reset. Next, at the time T37, the control signal PRES1 becomes low level and the FD reset switch 204 enters a non-conductive state, resulting in a floating state of the FD 203. The FD voltage VFD at this time is denoted as Nb signal. Further, the FD voltage VFD immediately after the reset of the FD 203 after the end of an accumulation period, which corresponds to the N signal of FIG. 10A, is called Na signal in this modified example for the purpose of distinction from the Nb signal. Further, a period corresponding to the N-AD period of FIG. 10A is called Na-AD period in this modified example.

At the time T38, the control signal PRES2 then becomes low level, and the ramp wave reset switch 208 enters a non-conductive state. The ramp wave voltage VRAMP output from the ramp wave generating unit 205 starts increasing, and AD conversion of the Nb signal is started. At the time T39, the control signal PRES2 becomes high level, and the ramp wave reset switch 208 enters a conductive state. Thereby, AD conversion of the Nb signal ends. A period from the time T38 to the time T39, that is, AD conversion period of the Nb signal is denoted as Nb-AD period. After the Nb-AD period, AD conversion of the Sb signal is performed in the same manner as the operation of FIG. 10A.

The AD conversion value of the Sa signal contains the Na signal and the first optical signal that is the signal component of charges generated in the PD 201*a* by photoelectric conversion. The Sb signal contains the Nb signal and the second optical signal that is the signal component of charges generated in the PD 201*b* by photoelectric conversion. Thus, the AD conversion value of the first optical signal is obtained by acquiring the difference between the AD conversion value of the Sa signal and the AD conversion value of the Na signal. Further, the AD conversion value of the second optical signal can be obtained by acquiring the difference between the AD conversion value of the Sb signal and the AD conversion value of the Nb signal. Calculation of these differences is performed in the memory 211 or the DFE 102, for example.

As discussed above, the Nb-AD period can be added between the Sa-AD period and the Sb-AD period. The operation of FIG. 10A has an advantage that the time from the end of an accumulation period to the end of AD conversion can be shortened compared to the operation of FIG. 10B. In contrast, in the operation of FIG. 10B, it is not necessary to hold both charges generated by the PD 201*a* and charges generated by the PD 201*b* in the FD 203 at the same time. Therefore, in the operation of FIG. 10B, the maximum value of the charge amount to be held in the FD 203 is reduced compared to the operation of FIG. 10A, allowing for an advantage of improved flexibility of design.

Note that, in the present embodiment, although the case where the number of PDs within a pixel is two has been exemplified, the number of PDs within a pixel may be three or more.

Fifth Embodiment

A fifth embodiment of the present invention will be described. A solid state imaging device according to the present embodiment is formed on a plurality of stacked substrates. The circuit configuration of the solid state imaging device will be described below based on that of the first embodiment unless otherwise specified. Without being limited thereto, however, the configuration of the present embodiment is applicable to any of the first to fourth embodiments.

Figure 11:
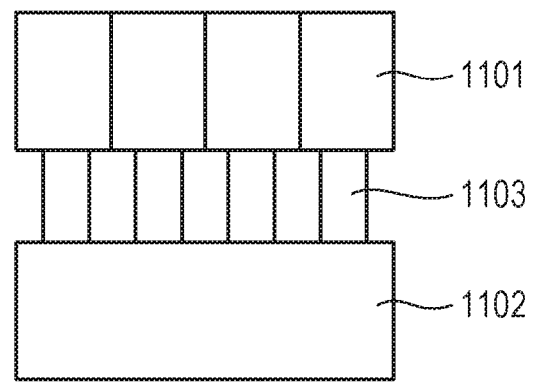
FIG. 11 is a schematic diagram of stacked structure of a solid state imaging device according to a fifth embodiment.

FIG. 11 is a schematic diagram of the stacked structure of the solid state imaging device according to the present embodiment. FIG. 11 illustrates a sectional view in the perpendicular direction to the substrate surface on which the solid state imaging device is arranged. The solid state imaging device according to the present embodiment has a first substrate 1101 including at least the PD 201, a second substrate 1102 including at least the counter 210 and the memory 211, and a substrate connection unit 1103.

The first substrate 1101 and the second substrate 1102 each may be a semiconductor substrate whose material is silicon, for example. The substrate connection unit 1103 mechanically and electrically connects the first substrate 1101 to the second substrate 1102.

Connection portions of the substrate connection unit 1103 may be provided correspondingly to the plurality of pixels 200, respectively. For example, when a plurality of PDs are included within a pixel as seen in the fourth embodiment, connection portions may be provided correspondingly to the plurality of PDs, respectively.

The substrate connection unit 1103 may be, for example, Through Silicon Via (TSV), micro bumps, direct bonding in which electrodes formed on each of the first substrate 1101 and the second substrate 1102 are directly attached to each other, or the like. Without being limited to the above, however, any connection structure may be applied as the substrate connection unit 1103. However, since TSV requires structure for penetrating the first substrate 1101, a sufficiently large region to form the PD 201 may not be obtained. It is therefore more preferable to apply micro bumps or direct bonding that does not require penetration of the first substrate 1101.

Figure 12:
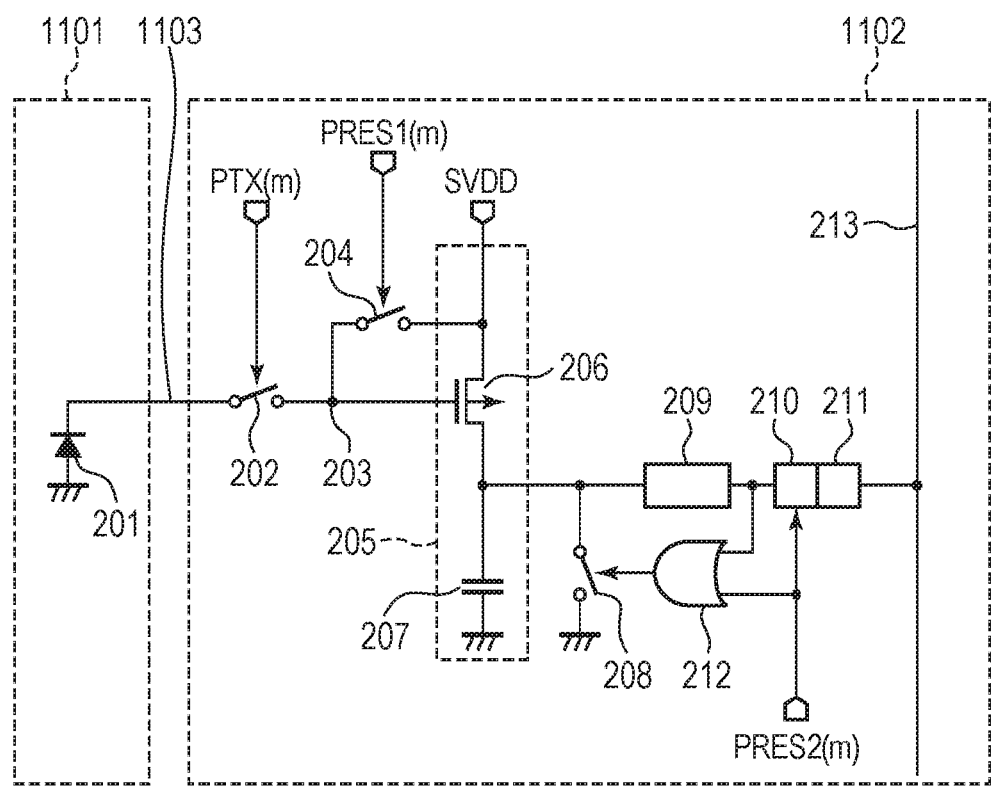
FIG. 12 is a circuit diagram of a pixel according to the fifth embodiment.
Figure 13:
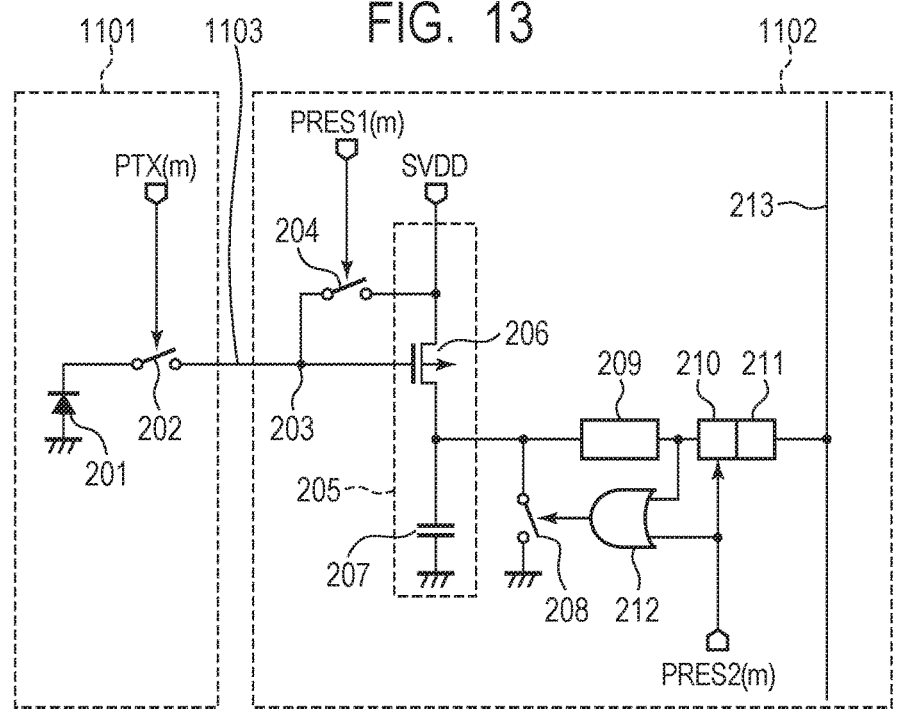
FIG. 13 is a circuit diagram of another pixel according to the fifth embodiment.
Figure 14:
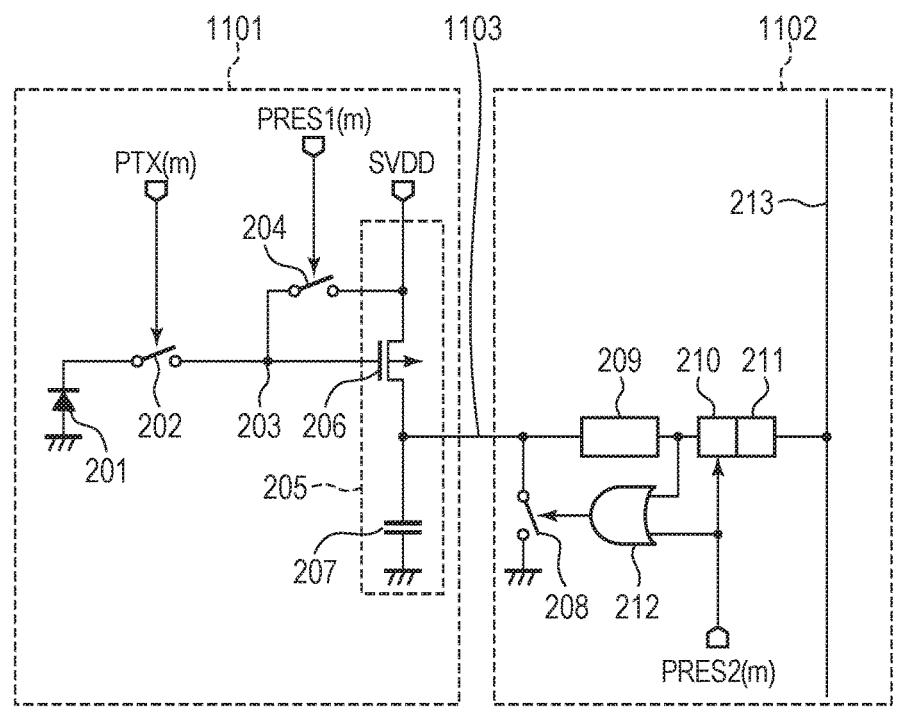
FIG. 14 is a circuit diagram of yet another pixel according to the fifth embodiment.

FIG. 12 to FIG. 14 are circuit diagrams each illustrating a circuit configuration of the pixel 200 and the relationship between the first substrate 1101 and the second substrate 1102 in the present embodiment. In FIG. 12, the PD 201 is arranged in the first substrate 1101, and other components such as the transfer switch 202 are arranged in the second substrate 1102. Further, the substrate connection unit 1103 is arranged between the PD 201 and the transfer switch 202. According to the exemplary configuration of FIG. 12, since the major part of the area of the first substrate 1101 can be used for formation of the PD 201, the area for the PD 201 can be increased, which can improve the sensitivity of the PD 201.

FIG. 13 is an exemplary configuration that is different from the configuration of FIG. 12 in that the transfer switch 202 is arranged on the first substrate 1101 instead of on the second substrate 1102. That is, the PD 201 and the transfer switch 202 are arranged on the first substrate 1101, and the remaining components are arranged on the second substrate 1102. Further, the substrate connection unit 1103 is arranged between the transfer switch 202 and the FD 203. In the exemplary configuration of FIG. 13, a parasitic capacitance occurring at the FD 203 may be larger than that in the example of FIG. 12. However, it is not necessary to form any contact to the substrate connection unit 1103 over the PD 201, which allows for an advantage of a reduced dark current noise occurring at the PD 201, and therefore the exemplary configuration of FIG. 13 may be more preferable in some cases.

FIG. 14 illustrates an exemplary configuration that is different from the configuration of FIG. 13 in that the FD reset switch 204 and the ramp wave generating unit 205 are arranged on the first substrate 1101 instead of on the second substrate 1102. That is, the PD 201, the transfer switch 202, the FD 203, the FD reset switch 204, and the ramp wave generating unit 205 are arranged on the first substrate 1101, and the remaining components are arranged on the second substrate 1102. Further, the substrate connection unit 1103 is arranged between the output node of the ramp wave generating unit 205, and the ramp wave switch 208 and the detection unit 209.

In the exemplary configuration of FIG. 14, all the high-withstand-voltage components (for example, 5V system, 3.3V system, or the like) can be formed on the first substrate 1101, and all the low-withstand-voltage components (for example, 1.2V system or the like) can be formed on the second substrate 1102. Furthermore, while the integration capacitor 207 may be formed on the first substrate 1101 as seen in FIG. 14, it may be formed on the second substrate 1102. In this case, by designing the film thickness between electrodes such that a formation process of an insulating film for the electrodes of the integration capacitor 207 can be shared with a formation process of an interlayer insulating film, a need for an additional process for forming the integration capacitor 207 is eliminated and the number of process steps can be reduced. More specifically, the insulating film thickness between the electrodes is designed to be thinner in the case where the integration capacitor 207 is formed on the second substrate 1102 than in the case where the integration capacitor 207 is formed on the first substrate 1101. This is because the interlayer insulating film formed on the second substrate 1102 is thinner than the interlayer insulating film formed on the first substrate 1101 due to the difference in the withstand voltage or the like. Such design of the integration capacitor 207 allows the thickness between the electrodes of the integration capacitor 207 to be adapted to the formation process of the interlayer insulating film, which can reduce the number of process steps.

Although the control signals PTX, PRES1, and PRES2 are generated in the vertical scanning circuit 101 in the first embodiment, these functions may lie in any one of the first substrate 1101 or the second substrate 1102 in the present embodiment. For example, the control signals PTX, PRES1, and PRES2 may be generated and supplied in components formed on the substrate on which each switch that is input with each signal is arranged. Alternatively, the control signals PTX, PRES1, and PRES2 may be generated at components formed on one of the first substrate 1101 and the second substrate 1102 and supplied to the other substrate if necessary. For example, the control signals PTX, PRES1, and PRES2 may be generated on the second substrate 1102 and supplied to the first substrate 1101 via control lines included in the substrate connection unit 1103. In this case, the control lines that transmit the control signals PTX, PRES1, and PRES2 may be those connected to each pixel 200 via the inside of the pixel array 100, or those connected to each pixel 200 via the outside of the pixel array 100.

Figure 15:
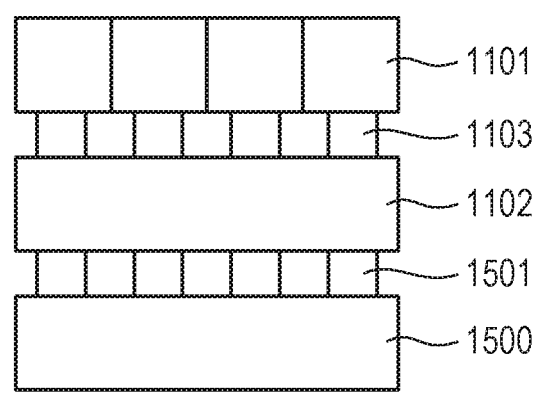
FIG. 15 is a schematic diagram of stacked structure of a solid state imaging device according to a modified example of the fifth embodiment.

Further, although FIG. 11 illustrates the exemplary configuration in which two substrates are stacked, the number of substrates to be stacked may be three or more. FIG. 15 is a schematic diagram illustrating the stacked structure of the solid state imaging device in which the first substrate 1101, the second substrate 1102, and a third substrate 1500 are stacked, as a modified example of the present embodiment. The substrate connection unit 1103 mechanically and electrically connects the first substrate 1101 to the second substrate 1102, and a substrate connection unit 1501 mechanically and electrically connects the second substrate 1102 to the third substrate 1500. For example, the configuration may be such that a circuit from the PD 201 to the ramp wave generating unit 205 is arranged on the first substrate 1101, a circuit from the ramp wave reset switch 208 to the memory 211 is arranged on the second substrate 1102, and a post stage circuit of the DFE 102 is arranged on the third substrate 1500. In this case, the digital value held in the memory 211 arranged on the second substrate 1102 is transmitted via the substrate connection unit 1501 to the DFE 102 arranged on the third substrate 1500. The DFE 102 functions as a digital signal processing circuit that performs predetermined signal processing such as correction, sorting, or the like on the digital value.

Sixth Embodiment

Figure 16:
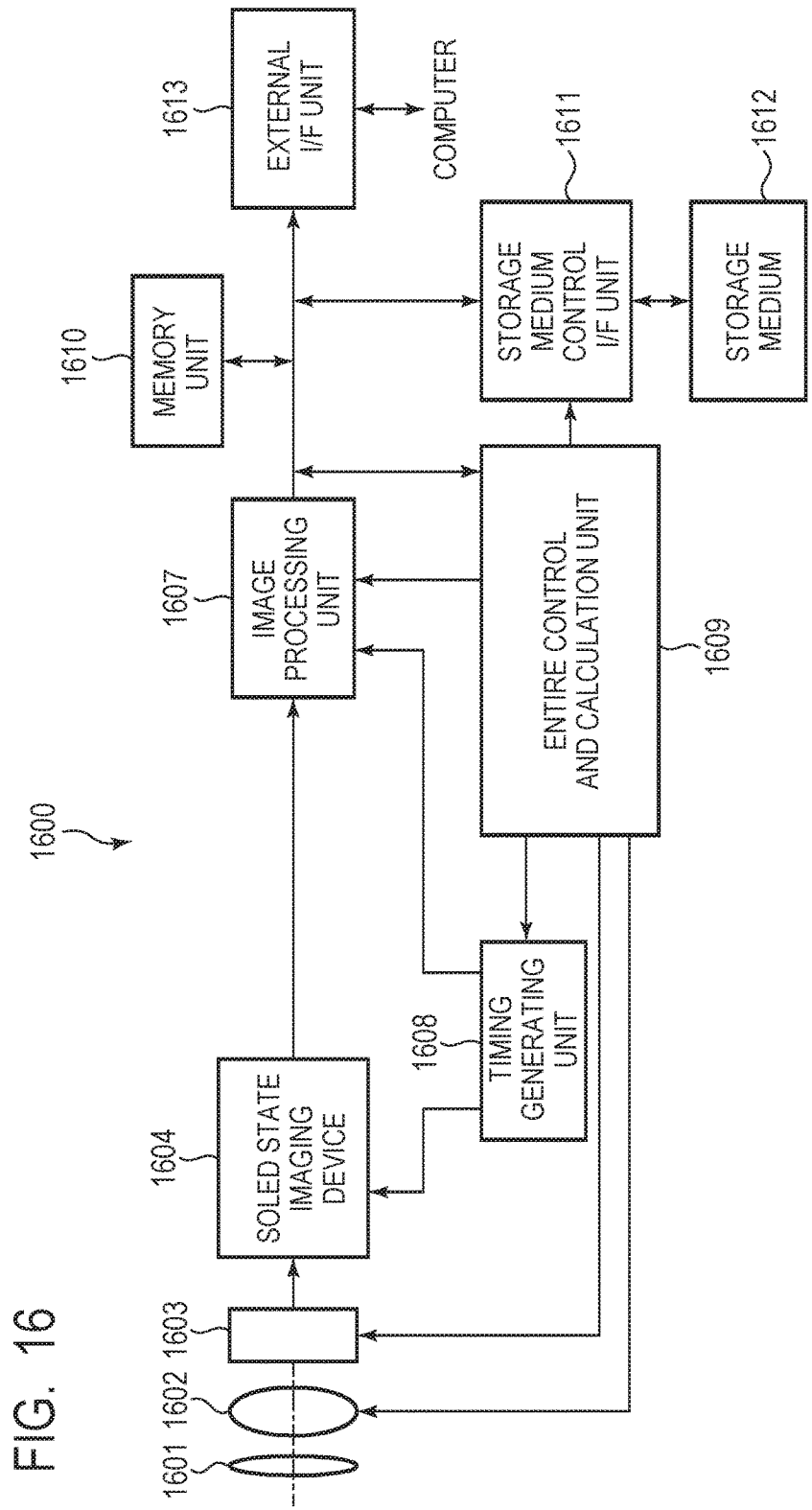
FIG. 16 is a block diagram of an imaging system according to a sixth embodiment.

An imaging system 1600 according to a sixth embodiment of the present invention will be described by using FIG. 16. FIG. 16 is a block diagram illustrating an exemplary configuration of the imaging system 1600 of the present embodiment.

The imaging system 1600 according to the present embodiment can be applied to, though not limited in particular, a digital still camera, a digital camcorder, a camera head, a copier machine, a fax machine, a mobile phone, an on-vehicle camera, a satellite, or the like, for example.

The imaging system 1600 has a barrier 1601, a lens 1602, a diaphragm 1603, a solid state imaging device 1604, an image processing unit 1607, a timing generating unit 1608, an entire control and calculation unit 1609, and a memory unit 1610. Further, the imaging system 1600 has a storage medium control I/F unit 1611 and an external I/F unit 1613 as an interface (I/F) to the outside of the imaging system 1600. The solid state imaging device according to any of the first to fifth embodiments can be applied to the solid state imaging device 1604.

The lens 1602 captures an optical image of an object on the solid state imaging device 1604. The diaphragm 1603 changes the light amount passing through the lens 1602. The barrier 1601 is provided for protection of the lens 1602. The solid state imaging device 1604 is the solid state imaging device described in the above embodiments and converts an optical image captured by the lens 1602 into image data.

The image processing unit 1607 is an image processing device that performs various processes such as correction and data compression on the image signal output from the solid state imaging device 1604. The image processing unit 1607 may be mounted on at least one of one or more substrates forming the solid state imaging device 1604, or may be mounted on a separate substrate. The timing generating unit 1608 outputs various timing signals to the solid state imaging device 1604 and the image processing unit 1607. The entire control and calculation unit 1609 is an entire control unit that controls the entire imaging system 1600. Here, the timing signals or the like may be input from the outside of the imaging system 1600, and the imaging system 1600 may be any system as long as it has at least the solid state imaging device 1604 and the image processing unit 1607 that processes an image signal output from the solid state imaging device 1604.

The memory unit 1610 is a frame memory unit for temporarily storing image data. The storage medium control I/F unit 1611 is an interface unit that performs storage to a storage medium 1612 or readout from the storage medium 1612. The storage medium 1612 is a removable storage medium such as a semiconductor memory or a storage medium built in the imaging system that performs storage or readout of imaging data. The external I/F unit 1613 is an interface unit for communicating with an external computer or the like.

As discussed above, the imaging system to which the solid state imaging device according to the first to fifth embodiments is applied is configured, which can realize the imaging system that can capture an image with a good gradation property for a low-brightness object.

Other Embodiments

The present invention can be modified in various ways without being limited to the embodiments described above. The configuration of the pixel 200 illustrated in FIG. 2 is a mere example, and the configuration of the pixel 200 that is applicable to the solid state imaging device of the present invention is not limited thereto. Further, the imaging system 1600 illustrated in the sixth embodiment is a mere example of imaging systems to which the solid state imaging device of the present invention may be applied, and the imaging system to which the solid state imaging device of the present invention can be applied is not limited to the configuration illustrated in FIG. 16.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-105158, filed May 26, 2016, which is hereby incorporated by reference herein in its entirety.

What is claimed is:

1. A solid state imaging device comprising:
   a first photoelectric conversion unit configured to generate a signal in accordance with an incident light by photoelectric conversion;
   a first transfer unit configured to transfer the signal from the first photoelectric conversion unit;
   a ramp wave generating unit that has an input node to which the signal is transferred and configured to generate a ramp wave whose voltage changes with time at a slope in accordance with a potential of the input node;
   a detection unit configured to detect a change in a relationship between a voltage of the ramp wave and a threshold voltage;
   a ramp wave reset unit configured to reset the voltage of the ramp wave when the detection unit detects a change in the relationship between the voltage of the ramp wave and the threshold voltage;
   a control unit configured to cause the detection unit to repeatedly detect a change in the relationship between the voltage of the ramp wave and the threshold voltage by repeating generation of the ramp wave by the ramp wave generating unit and the reset by the ramp wave reset unit within a predetermined period; and
   a digital value acquisition unit configured to acquire a digital value corresponding to the number of repetitions for which a change in the relationship between the voltage of the ramp wave and the threshold voltage is detected by the detection unit within the predetermined period.

2. The solid state imaging device according to claim 1, wherein the ramp wave generating unit comprises
   a first transistor configured to supply a current in accordance with the potential of the input node, and
   a first capacitor element configured to accumulate a signal by the current supplied from the first transistor and converts the accumulated signal into a voltage.

3. The solid state imaging device according to claim 2, wherein the ramp wave generating unit further comprises a second transistor cascode-connected between the first transistor and an output node of the ramp wave generating unit.

4. The solid state imaging device according to claim 2, wherein the ramp wave generating unit further comprises a buffer to which the potential of the input node is input, and an output potential from the buffer is input to a gate of the first transistor.

5. The solid state imaging device according to claim 2, wherein the ramp wave generating unit further comprises
a second capacitor element configured to accumulate a signal by the current supplied from the first transistor and configured to convert the accumulated signal into a voltage, and
a capacitor switch unit configured to cause the first transistor and the second capacitor element to enter a conductive state or a non-conductive state based on the potential of the input node.

6. The solid state imaging device according to claim 1, wherein the digital acquisition unit comprises
a counter configured to acquire a count value based on the number of repetitions for which a change in the relationship between the voltage of the ramp wave and the threshold voltage is detected by the detection unit within the predetermined period, and
a memory configured to store a count value acquired by the counter as the digital value.

7. The solid state imaging device according to claim 6 further comprising a count period switch unit configured to, based on the potential of the input node, change the predetermined period in which the counter acquires the count value.

8. The solid state imaging device according to claim 1 further comprising:
a third capacitor element to which the signal is transferred by the first transfer unit; and
a second transfer unit configured to transfer the signal from the third capacitor element to the input node.

9. The solid state imaging device according to claim 8 further comprising:
a second photoelectric conversion unit configured to generate a signal in accordance with an incident light by photoelectric conversion;
a third transfer unit configured to transfer the signal from the second photoelectric conversion unit;
a fourth capacitor element to which the signal is transferred by the third transfer unit; and
a fourth transfer unit configured to transfer the signal from the fourth capacitor element to the input node.

10. The solid state imaging device according to claim 1 further comprising:
a first substrate; and
a second substrate electrically connected to the first substrate,
wherein the first photoelectric conversion unit is formed on the first substrate, and the digital acquisition unit is formed on the second substrate.

11. The solid state imaging device according to claim 10, wherein the first transfer unit is formed on the second substrate.

12. The solid state imaging device according to claim 10, wherein the first transfer unit is formed on the first substrate.

13. The solid state imaging device according to claim 12, wherein the ramp wave generating unit is formed on the first substrate.

14. The solid state imaging device according to claim further comprising a third substrate electrically connected to the second substrate,
wherein the third substrate has a digital signal processing circuit configured to process the digital value acquired by the digital value acquisition unit.

15. An imaging system comprising:
a solid state imaging device including
a first photoelectric conversion unit configured to generate a signal in accordance with an incident light by photoelectric conversion,
a first transfer unit configured to transfer the signal from the first photoelectric conversion unit,
a ramp wave generating unit that has an input node to which the signal is transferred and configured to generate a ramp wave whose voltage changes with time at a slope in accordance with a potential of the input node,
a detection unit configured to detect a change in a relationship between a voltage of the ramp wave and a threshold voltage,
a ramp wave reset unit configured to reset the voltage of the ramp wave when the detection unit detects a change in the relationship between the voltage of the ramp wave and the threshold voltage,
a control unit configured to cause the detection unit to repeatedly detect a change in the relationship between the voltage of the ramp wave and the threshold voltage by repeating generation of the ramp wave by the ramp wave generating unit and the reset by the ramp wave reset unit within a predetermined period, and
a digital value acquisition unit configured to acquire a digital value corresponding to the number of repetitions for which a change in the relationship between the voltage of the ramp wave and the threshold voltage is detected by the detection unit within the predetermined period; and
an image processing unit configured to process an image signal output from the solid state imaging device.

* * * * *